United States Patent
Chaichanavong

(10) Patent No.: US 8,077,765 B1
(45) Date of Patent: Dec. 13, 2011

(54) MIXED MINIMUM MEAN SQUARE ERROR/ZERO-FORCING FIR FILTER ADAPTATION

(75) Inventor: Panu Chaichanavong, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 648 days.

(21) Appl. No.: 12/178,135

(22) Filed: Jul. 23, 2008

Related U.S. Application Data

(60) Provisional application No. 60/955,952, filed on Aug. 15, 2007.

(51) Int. Cl.
    *H04L 27/01* (2006.01)
(52) U.S. Cl. ........ 375/232; 375/229; 375/230; 375/231; 375/233; 375/234

(58) Field of Classification Search ............... 375/136, 375/147, 229, 232, 262, 263, 278, 240, 346, 375/230, 231, 233, 234; 708/300, 819; 333/18, 333/28
See application file for complete search history.

(56) References Cited

U.S. PATENT DOCUMENTS

| | | | |
|---|---|---|---|
| 2003/0095592 A1* | 5/2003 | Bergmans et al. | 375/232 |
| 2005/0175128 A1* | 8/2005 | Modrie et al. | 375/350 |
| 2008/0253438 A1* | 10/2008 | Riani et al. | 375/232 |
| 2009/0034646 A1* | 2/2009 | Feller | 375/285 |

* cited by examiner

*Primary Examiner* — Dhaval Patel

(57) ABSTRACT

A system and method of adapting a FIR filter with a mixed minimum-mean-square-error/zero-forcing adaptation is disclosed. A channel response module attempts to approximate a noiseless component of the channel response. The output of the channel response module is utilized to adapt a FIR filter module. In some embodiments, a combination of the output of the channel module and the noiseless channel output is utilized to adapt the FIR filter. In some embodiments, a second FIR filter module is utilized to process the noiseless channel output, which is then compared to the target response to generate an error signal, which may be used to adapt both the first and second FIR filter modules.

36 Claims, 8 Drawing Sheets

MIXED MINIMUM MEAN SQUARE ERROR/ZERO-FORCING FIR FILTER ADAPTATION

CROSS-REFERENCE TO RELATED APPLICATIONS

This application claims the benefit of U.S. Provisional Application No. 60/955,952 filed on Aug. 15, 2007. The disclosure of the above application is incorporated herein by reference in its entirety.

FIELD

The disclosure relates to equalizer adaptation systems and methods, and more particularly to a combination mixed mean square error (MMSE)/zero-forcing (ZF) equalizer adaptation system and method.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Finite impulse response (FIR) filters are used to shape and filter an input signal to obtain an output signal with desired characteristics. For example only, FIR filters may be used in Ethernet transceivers, read circuits for disk drives, ghost cancellation in broadcast and cable TV transmission, channel equalization for communication in magnetic recording, echo cancellation, estimation/prediction for speech processing, adaptive noise cancellation, etc.

Typically, an FIR filter includes multiple stages each including an input, a multiplier that multiples an input signal by a coefficient and a summer for summing the multiplication result with the output from an adjacent stage. The coefficients are selected to achieve the filtering and output characteristics desired in the output signal. These coefficients (or filter tap weights) are often variable, and can be determined from, e.g., a minimum mean squared error (MMSE) or least mean square (LMS) algorithm based on gradient optimization. FIR filters with coefficients that are variable are often called adaptive FIR filters. The input signal is a discrete time sequence that may be analog or digital. The output is also a discrete time sequence that is the convolution of the input sequence and the filter impulse response, as determined by the coefficients.

Virtually any linear system response can be modeled as an FIR response, as long as sufficient stages are provided. Because of this feature and relatively high stability, FIR filters have found widespread popularity and are used extensively.

Referring to FIG. 1, an adaptive FIR filter arrangement 10, which is commonly referred to as a least mean square (LMS) adaptation, is illustrated. An input 4 to channel module 5 may comprise a digital bit stream, although analog signals could also be utilized. Channel module 5 operates on input 4 and outputs a sample 11, which is then input to adaptive FIR filter module 12. This input 11 to adaptive FIR filter module 12 may be represented by the variable $r_k$ or $r(k)$, which can be governed by the equation:

$$r_k = C(a_k), \tag{1}$$

where $r_k$ equals the output 11 of channel module 5 at time k, $a_k$ is input 4 to channel module 5 at time k, and C(x) is the response of channel module 5 based on input x.

Adaptive FIR filter module 12 receives r input 11 and outputs FIR sample 13, which can be represented by the variable Y. The output 13 can be governed by the equation:

$$Y(k) = F(r_k), \tag{2}$$

where Y(k) equals output 13 of FIR filter module 12 at time k, $r_k$ is input 11 to FIR filter module 12 at time k, and F(x) is the response of FIR filter module 12 based on input x. The output 13 of FIR filter module 12 is received at detector module 14. The output 15 of detector module 14 reconstructs the binary bit stream 4 that is input to channel module 5. Under ideal conditions, the output 15 of detector module 14 is equal to input 4 of channel module 5.

Adaptive FIR filter module 12, in conjunction with detector module 14, reconstructs the binary bit stream 4 from the output 11 of channel module 5. This is accomplished by transforming the output 11 of channel module 5 into the input 4 as closely as possible. In practice, however, the impulse response of channel module 5 is unknown and may be somewhat unpredictable. This unpredictability is partially related to inter-symbol interference or noise that may be present in the channel module 5. Furthermore, cost or design considerations may dictate the use of low order filters or detectors of relatively low complexity such that an exact duplication of input 4 from output 11 may be impractical or impossible. Nonetheless, adaptive FIR filter module 12 is arranged in adaptive filter arrangement 10 such that a measurement of the error is minimized.

In the LMS adaptation of FIG. 1, output 15 of detector module 14 is input to a target response module 16. Target response module 16 comprises an impulse response that is designed to be the target response desired from FIR filter module 12. The output 17 of target response module 16 may be governed by:

$$Y'(k) = T(a'_k), \tag{3}$$

where Y'(k) equals output 17 of target response module 16 at time k, $a'_k$ is the output of detector module 14 at time k, and T(x) is the impulse response of target response module 16 based on input x.

FIR filter arrangement 10 is arranged such that the error between output 13 of FIR filter module 12 and output 17 of target response module 16 is minimized. This is accomplished by subtracting the output 13 of FIR filter module 12 from the output 17 of target response module 16 with adder 18 to generate error signal 19, which will be referred to as $e_k$ or e(k), which is the difference between output 13 and output 17 at time k. The error signal e(k) 19 is received at signum function module 20, which is governed by the equation:

$$\mathrm{sgn}(x) = \begin{Bmatrix} 1 & \text{if } x \geq 0 \\ -1 & \text{if } x < 0 \end{Bmatrix}. \tag{4}$$

The output 21 of signum function module 20 is then multiplied by r signal 11 to obtain FIR adaptation input 23.

Adaptive FIR filter module 12 utilizes input 23 to update its coefficients with equation:

$$f_i(k+1) = f_i(k) + \mu\,\mathrm{sgn}[e(k)]r(k-i), \tag{5}$$

where $f_i(x)$ equals the $i^{th}$ coefficient of FIR filter module 12 at time x, $$\text{sgn}(x) = \begin{cases} 1 & \text{if } x \geq 0 \\ -1 & \text{if } x < 0 \end{cases},$$  (5)

e(k) equals Y'(k)-Y(k), as described above, r(x) equals the output 11 of channel module 5 at time x, and $\mu$ is a constant, which is sometimes referred to as the adaptive step size. This arrangement 10 is sometimes referred to as a sign-error LMS algorithm. Alternatively, the signum function module 20 may be eliminated and the FIR filter module 12 may be adapted based on the equation:

$$f_i(k+1) = f_i(k) + \mu e(k) r(k-i),$$  (6)

where all of the variables are the same as above.

Referring now to FIG. 2, a FIR filter arrangement 30, often referred to as a zero-forcing (ZF) adaptation, is illustrated. In this example, channel module 25 receives binary bit stream input 24 and outputs ADC sample 31. Detector module 34 receives the output 33 of FIR filter module 32 and outputs a reconstructed bit stream 35, which, under ideal conditions, equals input stream 24. The adaptation input 43 to adaptive FIR filter module 32 comprises the output of multiplier 42, i.e., the product of the output 37 of target response module 36 and the output 41 of the signum function module 40 that receives as its input error signal 39, which is the difference between output 37 of target response module 36 and output 33 of FIR filter module 32. Adaptive FIR filter module 32 utilizes adaptation input 43 with the following equation:

$$f_i(k+1) = f_i(k) + \mu \, \text{sgn}[e(k)] Y'(k-1).$$  (7)

In each of the above adaptations, poor performance of FIR filter module 12 occurs under certain conditions. For example, the ZF adaptation may perform better than the LMS adaptation at low signal to noise ratios for inputs to the system. Unfortunately, however, this ZF adaptation may exhibit poor performance, including the failure to converge, under different operating conditions.

SUMMARY

In some embodiments of the present disclosure, a system for adapting an equalizer is disclosed. The system comprises: a channel module that receives input data and outputs a channel output comprising a noiseless component and a noise component; a filter module that filters the channel output to obtain a filter sample; a detector module that processes the filter sample to estimate the input data; a target response module that processes the estimated input data to obtain a target response output that comprises a desired response of the filter module; and a channel response module that processes the estimated input data to obtain a noiseless channel output that comprises an approximation of the noiseless component of the channel output, wherein the filter module is adapted based on the channel output, the filter sample, the target response output and the noiseless channel output.

In some embodiments, the filter module is adapted based on an error signal comprising a difference between the filter sample and the target response output.

In some embodiments, the filter module is adapted based on a product of the error signal and the noiseless channel output.

In some embodiments, the filter module is adapted based on a product of the error signal and the channel output.

In some embodiments, the filter module is adapted based on a product of the error signal and the noiseless channel output.

In some embodiments, the filter module is adapted based on a product of the error signal and a combination of the channel output and the noiseless channel output.

In some embodiments, the combination comprises an average of the channel output and the noiseless channel output. In some embodiments, the average is determined by the equation:

$$r_{mix}(k) = \lambda r'(k) + (1-\lambda) r(k),$$

where $r_{mix}(k)$ comprises the average of the channel output and noiseless channel output at time k, r'(k) comprises the noiseless channel output at time k, r(k) comprises the channel output at time k, and $\lambda$ comprises a constant having a value between 0 and 1, inclusive.

In some embodiments, the filter module is adapted such that the error signal is minimized.

In some embodiments, the filter module is adapted based on the equation:

$$f_i(k+1) = f_i(k) + \mu e(k) r_{mix}(k-i),$$

where i comprises an integer, $f_i(k)$ comprises an $i^{th}$ coefficient of the filter module at time k, e(k) comprises the error signal at time k, $\mu$ comprises a constant and $r_{mix}(k-i)$ comprises an average of the channel output and the noiseless channel output at time k−i.

In some embodiments, the noiseless channel output is based on the equation:

$$r'_k(a_{k-n} \ldots a_{k+m}) = r'_{previous}(a_{k-n} \ldots a_{k+m}) + \gamma(r_k - r'_{previous}(a_{k-n} \ldots a_{k+m})),$$

where $(a_{k-n} \ldots a_{k+m})$ comprises a data set comprised of the estimated input data at times k−n through k+m, $r'_k(a_{k-n} \ldots a_{k+m})$ comprises the noiseless channel output corresponding to $(a_{k-n} \ldots a_{k+m})$ at time k, $r'_{previous}(a_{k-n} \ldots a_{k+m})$ comprises the noiseless channel output corresponding to $(a_{k-n} \ldots a_{k+m})$ immediately preceding time k, $r_k$ comprises the channel output at time k and $\gamma$ comprises a constant.

In some embodiments, a system for adapting an equalizer is disclosed, comprising: a channel module that receives input data and outputs a channel output comprising a noiseless component and a noise component; a first filter module that filters the channel output to obtain a first filter sample; a detector module that processes the filter sample to estimate the input data; a target response module that processes the estimated input data to obtain a target response output that comprises a desired response of the first filter module; a channel response module that processes the estimated input data to obtain a noiseless channel output that comprises an approximation of the noiseless component of the channel output; and a second filter module that filters the noiseless channel output to obtain a second filter sample; wherein the first and second filter modules are adapted based on the channel output, the first filter sample, the second filter sample, the target response output and the noiseless channel output.

In some embodiments, the first and second filter modules are adapted based on a first error signal comprising a first difference between the first filter sample and the target response output.

In some embodiments, the first and second filter modules are adapted based on a first product of the first error signal and the channel output.

In some embodiments, the first and second filter modules are adapted based on a second error signal comprising a second difference between the second filter sample and the target response output.

In some embodiments, the first and second filter modules are adapted based on a second product of the second error signal and the noiseless channel output.

In some embodiments, the first and second filter modules are adapted based on a combination of the first product and the second product.

In some embodiments, the combination comprises an average of the first product and the second product.

In some embodiments, the average is determined by the equation:

$$A_{mix}(k)=\lambda A'(k)+(1-\lambda)A(k),$$

where $A_{mix}(k)$ comprises the average of the first and second products at time k, $A'(k)$ comprises the first product at time k, $A(k)$ comprises the second product at time k, and $\lambda$ comprises a constant having a value between 0 and 1, inclusive.

In some embodiments, the first and second filter modules are adapted based on the equation:

$$f_i(k+1)=f_i(k)+\lambda\mu e''(k)r'(k-i)+(1-\lambda)\mu e(k)r(k-i),$$

where i comprises an integer, $f_i(k)$ comprises an $i^{th}$ coefficient of the first and second filter modules at time k, e(k) comprises the first error signal at time k, e''(k) comprises the second error signal at time k, $\mu$ comprises a constant, r(k−i) comprises the channel output at time k−i, r'(k−i) comprises the noiseless channel output at time k−i, and $\lambda$ comprises a constant having a value between 0 and 1, inclusive.

In some embodiments, the first and second filter modules are adapted such that the first error signal is minimized.

In some embodiments, the noiseless channel output is based on the equation:

$$r'_k(a_{k-n} \ldots a_{k+m})=r'_{previous}(a_{k-n} \ldots a_{k+m})+\gamma(r_k - r'_{previous}(a_{k-n} \ldots a_{k+m})),$$

where $(a_{k-n} \ldots a_{k+m})$ comprises a data set comprised of the estimated input data at times k−n through k+m, $r'_k(a_{k-n} \ldots a_{k+m})$ comprises the noiseless channel output corresponding to $(a_{k-n} \ldots a_{k+m})$ at time k, $r'_{previous}(a_{k-n} \ldots a_{k+m})$ comprises the noiseless channel output corresponding to $(a_{k-n} \ldots a_{k+m})$ immediately preceding time k, $r_k$ comprises the channel output at time k and $\gamma$ comprises a constant.

In some embodiments, a method for adapting an equalizer is disclosed, comprising: processing input data to obtain a channel output comprising a noiseless component and a noise component; filtering the channel output with a filter module to obtain a filter sample; processing the filter sample to estimate the input data; processing the estimated input data to obtain a target response output that comprises a desired response of the filter module; processing the estimated input data to obtain a noiseless channel output that comprises an approximation of the noiseless component of the channel output; and adapting the filter module based on the channel output, the filter sample, the target response output and the noiseless channel output.

In some embodiments, the filter module is adapted based on an error signal comprising a difference between the filter sample and the target response output.

In some embodiments, the filter module is adapted based on a product of the error signal and the noiseless channel output.

In some embodiments, the filter module is adapted based on a product of the error signal and the channel output.

In some embodiments, the filter module is adapted based on a product of the error signal and the noiseless channel output.

In some embodiments, the filter module is adapted based on a product of the error signal and a combination of the channel output and the noiseless channel output.

In some embodiments, the combination comprises an average of the channel output and the noiseless channel output.

In some embodiments, the average is determined by the equation:

$$r_{mix}(k)=\lambda r'(k)+(1-\lambda)r(k),$$

where $r_{mix}(k)$ comprises the average of the channel output and noiseless channel output at time k, r'(k) comprises the noiseless channel output at time k, r(k) comprises the channel output at time k, and $\lambda$ comprises a constant having a value between 0 and 1, inclusive.

In some embodiments, the filter module is adapted such that the error signal is minimized.

In some embodiments, the filter module is adapted based on the equation:

$$f_i(k+1)=f_i(k)+\mu e(k)r_{mix}(k-i),$$

where i comprises an integer, $f_i(k)$ comprises an $i^{th}$ coefficient of the filter module at time k, e(k) comprises the error signal at time k, $\mu$ comprises a constant and $r_{mix}(k-i)$ comprises an average of the channel output and the noiseless channel output at time k−i.

In some embodiments, the noiseless channel output is based on the equation:

$$r'_k(a_{k-n} \ldots a_{k+m})=r'_{previous}(a_{k-n} \ldots a_{k+m})+\gamma(r_k - r'_{previous}(a_{k-n} \ldots a_{k+m})),$$

where $(a_{k-n} \ldots a_{k+m})$ comprises a data set comprised of the estimated input data at times k−n through k+m, $r'_k(a_{k-n} \ldots a_{k+m})$ comprises the noiseless channel output corresponding to $(a_{k-n} \ldots a_{k+m})$ at time k, $r'_{previous}(a_{k-n} \ldots a_{k+m})$ comprises the noiseless channel output corresponding to $(a_{k-n} \ldots a_{k+m})$ immediately preceding time k, $r_k$ comprises the channel output at time k and $\gamma$ comprises a constant.

In some embodiments, a method for adapting an equalizer is disclosed, comprising: processing input data to obtain a channel output comprising a noiseless component and a noise component; filtering the channel output with a first filter module to obtain a first filter sample; processing the filter sample to estimate the input data; processing the estimated input data to obtain a target response output that comprises a desired response of the first filter module; processing the estimated input data to obtain a noiseless channel output that comprises an approximation of the noiseless component of the channel output; filtering the noiseless channel output with a second filter module to obtain a second filter sample; and adapting the first and second filter modules based on the channel output, the first filter sample, the second filter sample, the target response output and the noiseless channel output.

In some embodiments, the first and second filter modules are adapted based on a first error signal comprising a first difference between the first filter sample and the target response output.

In some embodiments, the first and second filter modules are adapted based on a first product of the first error signal and the channel output.

In some embodiments, the first and second filter modules are adapted based on a second error signal comprising a second difference between the second filter sample and the target response output.

In some embodiments, the first and second filter modules are adapted based on a second product of the second error signal and the noiseless channel output.

In some embodiments, the first and second filter modules are adapted based on a combination of the first product and the second product.

In some embodiments, the combination comprises an average of the first product and the second product.

In some embodiments, the average is determined by the equation:

$$A_{mix}(k)=\lambda A'(k)+(1-\lambda)A(k),$$

where $A_{mix}(k)$ comprises the average of the first and second products at time k, $A'(k)$ comprises the first product at time k, $A(k)$ comprises the second product at time k, and $\lambda$ comprises a constant having a value between 0 and 1, inclusive.

In some embodiments, the first and second filter modules are adapted based on the equation:

$$f_i(k+1)=f_i(k)+\lambda\mu e''(k)r'(k-i)+(1-\lambda)\mu e(k)r(k-i),$$

where i comprises an integer, $f_i(k)$ comprises an $i^{th}$ coefficient of the first and second filter modules at time k, e(k) comprises the first error signal at time k, e''(k) comprises the second error signal at time k, $\mu$ comprises a constant, r(k–i) comprises the channel output at time k–i, r'(k–i) comprises the noiseless channel output at time k–i, and $\lambda$ comprises a constant having a value between 0 and 1, inclusive.

In some embodiments, the first and second filter modules are adapted such that the first error signal is minimized.

In some embodiments, the noiseless channel output is based on the equation:

$$r'_k(a_{k-n} \ldots a_{k+m})=r'_{previous}(a_{k-n} \ldots a_{k+m})+\gamma(r_k-r'_{previous}(a_{k-n} \ldots a_{k+m})),$$

where $(a_{k-n} \ldots a_{k+m})$ comprises a data set comprised of the estimated input data at times k–n through k+m, $r'_k(a_{k-n} \ldots a_{k+m})$ comprises the noiseless channel output corresponding to $(a_{k-n} \ldots a_{k+m})$ at time k, $r'_{previous}(a_{k-n} \ldots a_{k+m})$ comprises the noiseless channel output corresponding to $(a_{k-n} \ldots a_{k+m})$ immediately preceding time k, $r_k$ comprises the channel output at time k and $\gamma$ comprises a constant.

In some embodiments, a computer program stored on a computer readable medium and executed by a processor for adapting an equalizer is disclosed, comprising: processing input data to obtain a channel output comprising a noiseless component and a noise component; filtering the channel output with a filter module to obtain a filter sample; processing the filter sample to estimate the input data; processing the estimated input data to obtain a target response output that comprises a desired response of the filter module; processing the estimated input data to obtain a noiseless channel output that comprises an approximation of the noiseless component of the channel output; and adapting the filter module based on the channel output, the filter sample, the target response output and the noiseless channel output In some embodiments, the filter module is adapted based on an error signal comprising a difference between the filter sample and the target response output.

In some embodiments, the filter module is adapted based on a product of the error signal and the noiseless channel output.

In some embodiments, the filter module is adapted based on a product of the error signal and the channel output.

In some embodiments, the filter module is adapted based on a product of the error signal and the noiseless channel output.

In some embodiments, the filter module is adapted based on a product of the error signal and a combination of the channel output and the noiseless channel output.

In some embodiments, the combination comprises an average of the channel output and the noiseless channel output.

In some embodiments, the average is determined by the equation:

$$r_{mix}(k)=\lambda r'(k)+(1-\lambda)r(k),$$

where $r_{mix}(k)$ comprises the average of the channel output and noiseless channel output at time k, r'(k) comprises the noiseless channel output at time k, r(k) comprises the channel output at time k, and $\lambda$ comprises a constant having a value between 0 and 1, inclusive.

In some embodiments, the filter module is adapted such that the error signal is minimized.

In some embodiments, the filter module is adapted based on the equation:

$$f_i(k+1)=f_i(k)+\mu e(k)r_{mix}(k-i),$$

where i comprises an integer, $f_i(k)$ comprises an $i^{th}$ coefficient of the filter module at time k, e(k) comprises the error signal at time k, $\mu$ comprises a constant and $r_{mix}(k-i)$ comprises an average of the channel output and the noiseless channel output at time k–i.

In some embodiments, the noiseless channel output is based on the equation:

$$r'_k(a_{k-n} \ldots a_{k+m})=r'_{previous}(a_{k-n} \ldots a_{k+m})+\gamma(r_k-r'_{previous}(a_{k-n} \ldots a_{k+m})),$$

where $(a_{k-n} \ldots a_{k+m})$ comprises a data set comprised of the estimated input data at times k–n through k+m, $r'_k(a_{k-n} \ldots a_{k+m})$ comprises the noiseless channel output corresponding to $(a_{k-n} \ldots a_{k+m})$ at time k, $r'_{previous}(a_{k-n} \ldots a_{k+m})$ comprises the noiseless channel output corresponding to $(a_{k-n} \ldots a_{k+m})$ immediately preceding time k, $r_k$ comprises the channel output at time k and $\gamma$ comprises a constant.

In some embodiments, a computer program stored on a computer readable medium and executed by a processor for adapting an equalizer is disclosed, comprising: processing input data to obtain a channel output comprising a noiseless component and a noise component; filtering the channel output with a first filter module to obtain a first filter sample; processing the filter sample to estimate the input data; processing the estimated input data to obtain a target response output that comprises a desired response of the first filter module; processing the estimated input data to obtain a noiseless channel output that comprises an approximation of the noiseless component of the channel output; filtering the noiseless channel output with a second filter module to obtain a second filter sample; and adapting the first and second filter modules based on the channel output, the first filter sample, the second filter sample, the target response output and the noiseless channel output.

In some embodiments, the first and second filter modules are adapted based on a first error signal comprising a first difference between the first filter sample and the target response output.

In some embodiments, the first and second filter modules are adapted based on a first product of the first error signal and the channel output.

In some embodiments, the first and second filter modules are adapted based on a second error signal comprising a second difference between the second filter sample and the target response output.

In some embodiments, the first and second filter modules are adapted based on a second product of the second error signal and the noiseless channel output.

In some embodiments, the first and second filter modules are adapted based on a combination of the first product and the second product.

In some embodiments, the combination comprises an average of the first product and the second product.

In some embodiments, the average is determined by the equation:

$$A_{mix}(k)=\lambda A'(k)+(1-\lambda)A(k),$$

where $A_{mix}(k)$ comprises the average of the first and second products at time k, $A'(k)$ comprises the first product at time k, $A(k)$ comprises the second product at time k, and $\lambda$ comprises a constant having a value between 0 and 1, inclusive.

In some embodiments, the first and second filter modules are adapted based on the equation:

$$f_i(k+1)=f_i(k)+\lambda\mu e''(k)r'(k-i)+(1-\lambda)\mu e(k)r(k-i),$$

where i comprises an integer, $f_i(k)$ comprises an $i^{th}$ coefficient of the first and second filter modules at time k, e(k) comprises the first error signal at time k, e''(k) comprises the second error signal at time k, $\mu$ comprises a constant, r(k-i) comprises the channel output at time k-i, r'(k-i) comprises the noiseless channel output at time k-i, and $\lambda$ comprises a constant having a value between 0 and 1, inclusive.

In some embodiments, the first and second filter modules are adapted such that the first error signal is minimized.

In some embodiments, the noiseless channel output is based on the equation:

$$r'hd\ k(a_{k-n}\ldots a_{k+m})=r'_{previous}(a_{k-n}\ldots a_{k+m})+\gamma(r_k-r'_{previous}(a_{k-n}\ldots a_{k+m})),$$

where $(a_{k-n}\ldots a_{k+m})$ comprises a data set comprised of the estimated input data at times k-n through k+m, $r'_k(a_{k-n}\ldots a_{k+m})$ comprises the noiseless channel output corresponding to $(a_{k-n}\ldots a_{k+m})$ at time k, $r'_{previous}(a_{k-n}\ldots a_{k+m})$ comprises the noiseless channel output corresponding to $(a_{k-n}\ldots a_{k+m})$ immediately preceding time k, $r_k$ comprises the channel output at time k and $\gamma$ comprises a constant.

In some embodiments, a system for adapting an equalizer is disclosed, comprising: channel means for receiving input data and outputs a channel output comprising a noiseless component and a noise component; filter means for filtering the channel output to obtain a filter sample; detector means for processing the filter sample to estimate the input data; target response means for processing the estimated input data to obtain a target response output that comprises a desired response of the filter means; and channel response means for processing the estimated input data to obtain a noiseless channel output that comprises an approximation of the noiseless component of the channel output, wherein the filter means is adapted based on the channel output, the filter sample, the target response output and the noiseless channel output.

In some embodiments, the filter means is adapted based on an error signal comprising a difference between the filter sample and the target response output.

In some embodiments, the filter means is adapted based on a product of the error signal and the noiseless channel output.

In some embodiments, the filter means is adapted based on a product of the error signal and the channel output.

In some embodiments, the filter means is adapted based on a product of the error signal and the noiseless channel output.

In some embodiments, the filter means is adapted based on a product of the error signal and a combination of the channel output and the noiseless channel output.

In some embodiments, the combination comprises an average of the channel output and the noiseless channel output.

In some embodiments, the average is determined by the equation:

$$r_{mix}(k)=\lambda r'(k)+(1-\lambda)r(k),$$

where $r_{mix}(k)$ comprises the average of the channel output and noiseless channel output at time k, r'(k) comprises the noiseless channel output at time k, r(k) comprises the channel output at time k, and $\lambda$ comprises a constant having a value between 0 and 1, inclusive.

In some embodiments, the filter means is adapted such that the error signal is minimized.

In some embodiments, the filter means is adapted based on the equation:

$$f_i(k+1)=f_i(k)+\mu e(k)r_{mix}(k-i),$$

where i comprises an integer, $f_i(k)$ comprises an $i^{th}$ coefficient of the filter means at time k, e(k) comprises the error signal at time k, $\mu$ comprises a constant and $r_{mix}(k-i)$ comprises an average of the channel output and the noiseless channel output at time k-i.

In some embodiments, the noiseless channel output is based on the equation:

$$r'hd\ k(a_{k-n}\ldots a_{k+m})=r'_{previous}(a_{k-n}\ldots a_{k+m})+\gamma(r_k-r'_{previous}(a_{k-n}\ldots a_{k+m})),$$

where $(a_{k-n}\ldots a_{k+m})$ comprises a data set comprised of the estimated input data at times k-n through k+m, $r'_k(a_{k-n}\ldots a_{k+m})$ comprises the noiseless channel output corresponding to $(a_{k-n}\ldots a_{k+m})$ at time k, $r'_{previous}(a_{k-n}\ldots a_{k+m})$ comprises the noiseless channel output corresponding to $(a_{k-n}\ldots a_{k+m})$ immediately preceding time k, $r_k$ comprises the channel output at time k and $\gamma$ comprises a constant.

In some embodiments, a system for adapting an equalizer is disclosed, comprising: channel means for receiving input data and outputs a channel output comprising a noiseless component and a noise component; first filter means for filtering the channel output to obtain a first filter sample; detector means for processing the filter sample to estimate the input data; target response means for processing the estimated input data to obtain a target response output that comprises a desired response of the first filter means; channel response means for processing the estimated input data to obtain a noiseless channel output that comprises an approximation of the noiseless component of the channel output; and second filter means for filtering the noiseless channel output to obtain a second filter sample; wherein the first and second filter means are adapted based on the channel output, the first filter sample, the second filter sample, the target response output and the noiseless channel output.

In some embodiments, the first and second filter means are adapted based on a first error signal comprising a first difference between the first filter sample and the target response output.

In some embodiments, the first and second filter means are adapted based on a first product of the first error signal and the channel output.

In some embodiments, the first and second filter means are adapted based on a second error signal comprising a second difference between the second filter sample and the target response output.

In some embodiments, the first and second filter means are adapted based on a second product of the second error signal and the noiseless channel output.

In some embodiments, the first and second filter means are adapted based on a combination of the first product and the second product.

In some embodiments, the combination comprises an average of the first product and the second product.

In some embodiments, the average is determined by the equation:

$$A_{mix}(k)=\lambda A'(k)+(1-\lambda)A(k),$$

where $A_{mix}(k)$ comprises the average of the first and second products at time k, A'(k) comprises the first product at time k, A(k) comprises the second product at time k, and λ comprises a constant having a value between 0 and 1, inclusive.

In some embodiments, the first and second filter means are adapted based on the equation:

$$f_i(k+1)=f_i(k)+\lambda\mu e''(k)r'(k-i)+(1-\lambda)\mu e(k)r(k-i),$$

where i comprises an integer, $f_i(k)$ comprises an $i^{th}$ coefficient of the first and second filter means at time k, e(k) comprises the first error signal at time k, e''(k) comprises the second error signal at time k, μ comprises a constant, r(k−i) comprises the channel output at time k−i, r'(k−i) comprises the noiseless channel output at time k−i, and λ comprises a constant having a value between 0 and 1, inclusive.

In some embodiments, the first and second filter means are adapted such that the first error signal is minimized.

In some embodiments, the noiseless channel output is based on the equation:

$$r'_k(a_{k-n} \ldots a_{k+m})=r'_{previous}(a_{k-n} \ldots a_{k+m})+\gamma(r_k - r'_{previous}(a_{k-n} \ldots a_{k+m})),$$

where $(a_{k-n} \ldots a_{k+m})$ comprises a data set comprised of the estimated input data at times k−n through k+m, $r'_k(a_{k-n} \ldots a_{k+m})$ comprises the noiseless channel output corresponding to $(a_{k-n} \ldots a_{k+m})$ at time k, $r'_{previous}(a_{k-n} \ldots a_{k+m})$ comprises the noiseless channel output corresponding to $(a_{k-n} \ldots a_{k+m})$ immediately preceding time k, $r_k$ comprises the channel output at time k and γ comprises a constant.

In some embodiments, the systems and methods described above are implemented by a computer program executed by one or more processors. The computer program can reside on a computer readable medium such as but not limited to memory, nonvolatile data storage, and/or other suitable tangible storage mediums.

Further areas of applicability of the present disclosure will become apparent from the detailed description, the claims and the drawings. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
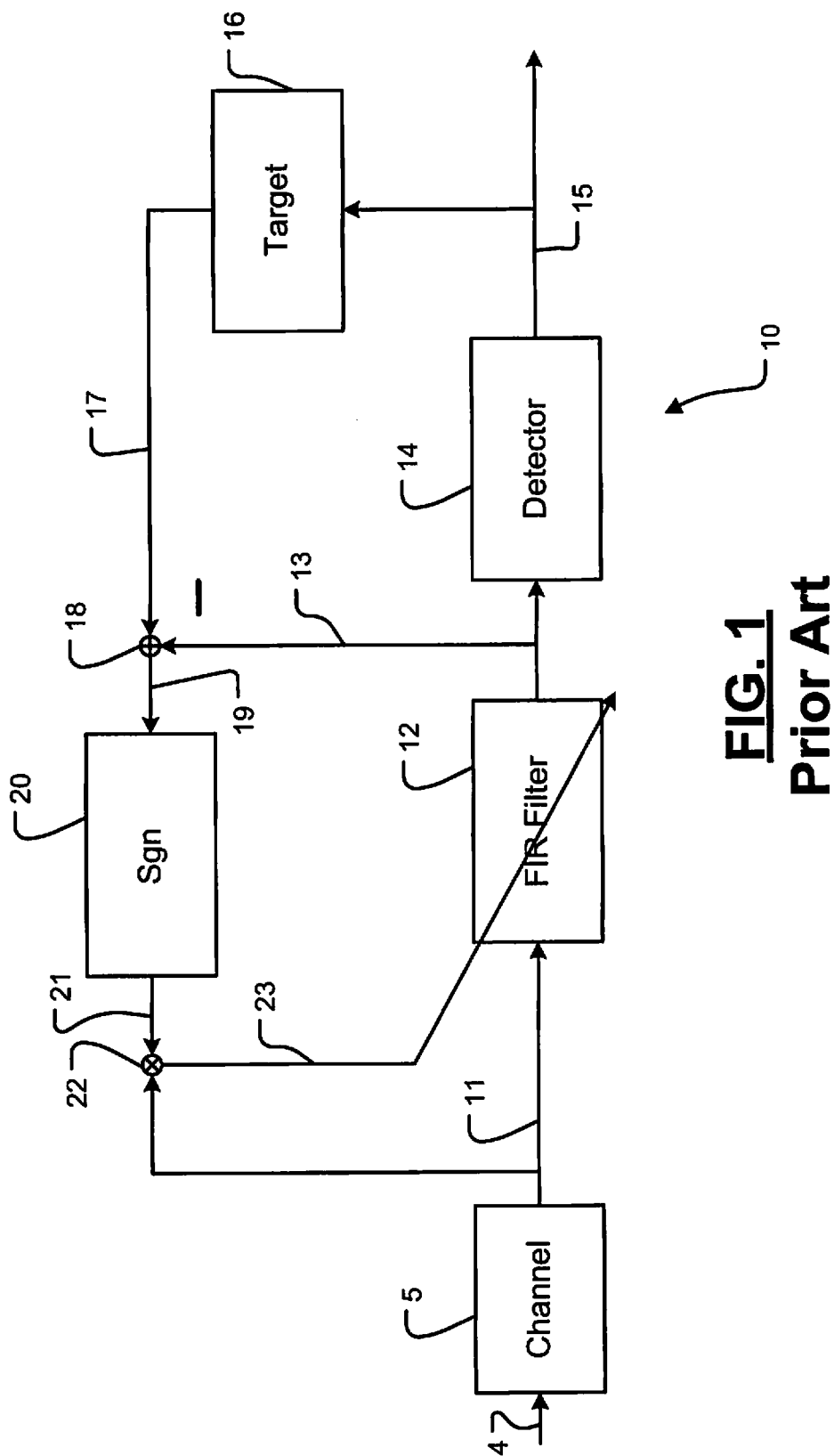
FIG. 1 is a functional block diagram of a FIR filter arrangement according to the prior art.
Figure 2:
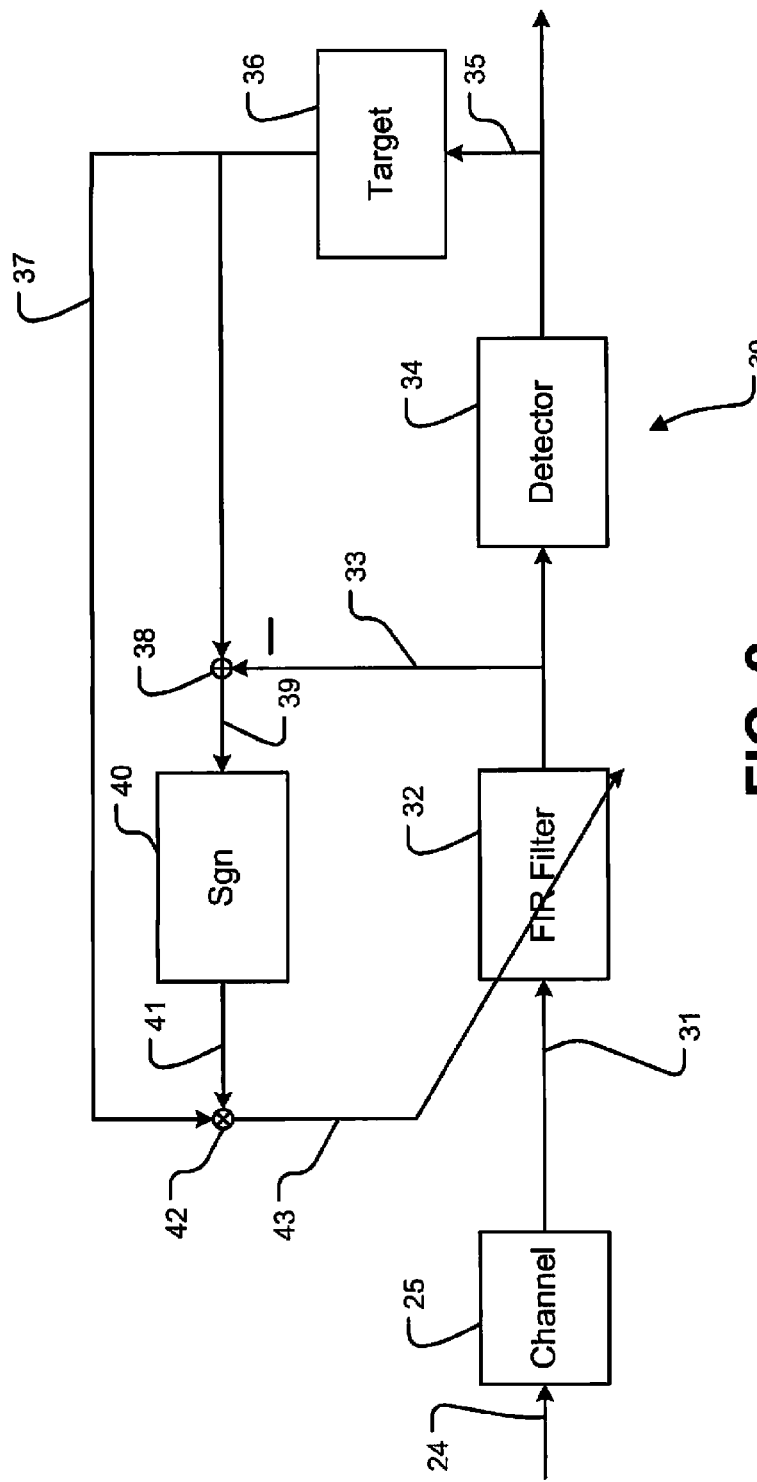
FIG. 2 is a functional block diagram of another FIR filter arrangement according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, and/or a combinational logic circuit.

Figure 3:
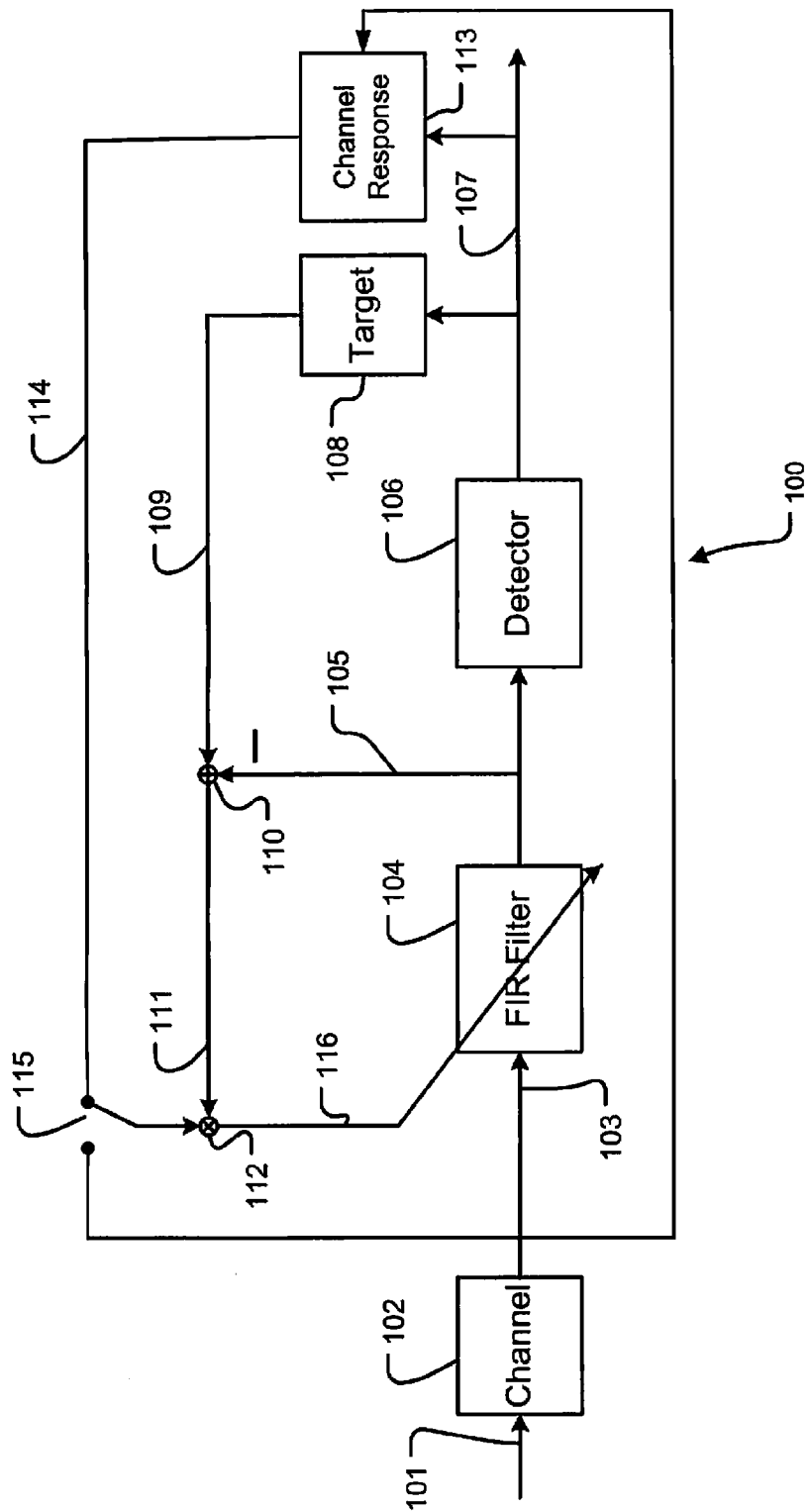
FIG. 3 is a functional block diagram of a FIR filter arrangement according to various embodiments of the present disclosure.

Referring now to FIG. 3, a FIR filter arrangement 100 is illustrated. A binary bit stream input 101 ($a_k$ or a(k)) is received by channel module 102, which outputs an analog-to-digital converter (ADC) sample 103 output ($r_k$ or r(k)). ADC sample 103 is input into FIR filter module 104, which outputs a FIR sample 105, which will be referred to as signal $Y_k$ or Y(k). FIR sample 105 is received by detector module 106, which outputs a binary bit stream $a'_k$ or a'(k) on line 107.

As is the case with the LMS adaptation discussed above in reference to FIG. 1, binary bit stream 107 is utilized by target response module 108 to form a reconstructed FIR sample 109, which will be referred to as $Y'_k$ or Y'(k). Addition module 110 outputs error signal $e_k$ or e(k), which is equal to Y'(k)−Y(k). Error signal 111 is utilized with multiplication module 112, as discussed more fully below.

In contrast to the prior art LMS adaptation discussed above, reconstructed binary bit stream 107 is further utilized by a channel response module 113. Channel response module 113 reconstructs the $r_k$ signal 103 to obtain value $r'_k$ or r'(k) 114, as will be discussed more fully below. This reconstructed ADC sample $r'_k$ will be used to further adapt FIR filter module 104. In the exemplary embodiment of FIG. 3, switching module 115 controls the adaptation mode of FIR filter module 104. When set in the ZF mode, FIR filter module 104 receives as its input 116 the product of error signal e(k) 111 and reconstructed ADC sample $r'_k$ 114. Thus, FIR filter module 104 will be adapted according to the following equation:

$$f_i(k+1)=f_i(k)+\mu e(k)r'(k-i), \tag{8}$$

where μ is constant, r'(k−i) is the reconstructed ADC sample 114 at time (k−i) and all other variables are the same as above. In LMS mode, FIR filter module 104 receives as its input 116 the product of $r_k$ signal 103 and error signal e(k) 111. Thus, FIR filter module 104 is adapted according to the following equation:

$$f_i(k+1)=f_i(k)+\mu e(k)r(k-i), \tag{9}$$

where r(k−i) equals the channel output r 103 at time (k−i) and all other variables are the same as above. The switching between the ZF and MMSE modes is accomplished by switching module 115. The switching module 115 may be set at the time of manufacture or, alternatively, may be adjustable by a user of the system in order to tune performance of filter arrangement 100.

Figure 4:
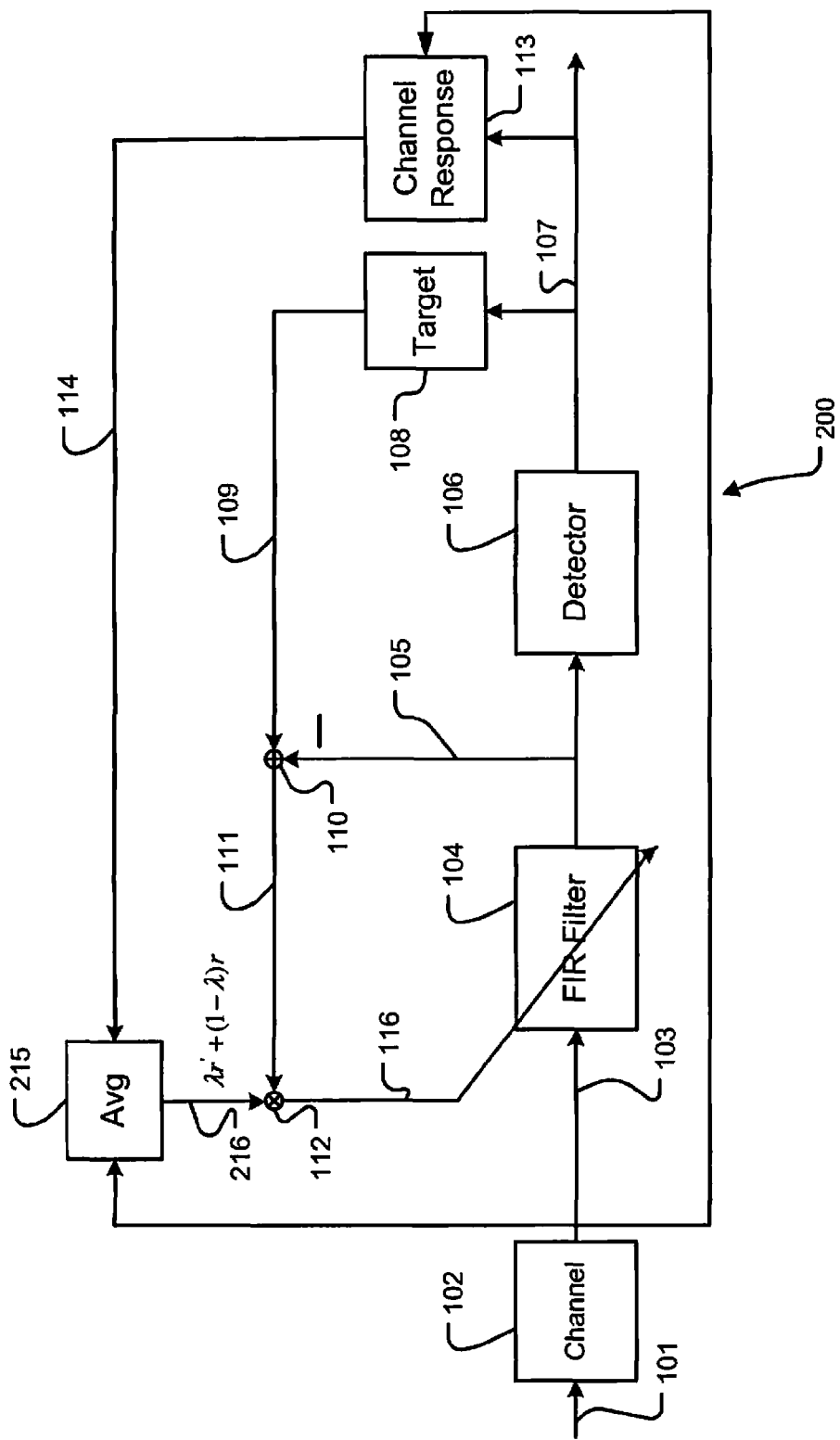
FIG. 4 is a functional block diagram of a FIR filter arrangement according to various embodiments of the present disclosure.

Referring now to FIG. 4, FIR filter arrangement 200 according to various embodiments of the present disclosure is illustrated. FIR filter arrangement 200 is similar to FIR filter arrangement 100 illustrated in FIG. 3, and the same reference numerals are used to reference common elements present in both arrangements 100, 200. One difference between FIR filter arrangement 100 and FIR filter arrangement 200 is that the switching module 115 of arrangement 100 has been replaced with an averaging module 215 in arrangement 200. Averaging module 215 is configured to provide a mixed adaptation to FIR filter module 104. FIR filter module 104 will receive as its input 116 the product of the error signal e(k) 111 and the output 216 of averaging module 215. The output of averaging module 215 may be governed by the following equation:

$$r_{mix}(k)=\lambda r'(k)+(1-\lambda)r(k), \quad (10)$$

where $r_{mix}(k)$ is the input 216 to multiplication module 112 at time k, r(k) equals output 103 of channel module 102 at time k, r'(k) equals the output 114 of channel response module 113 at time k, and λ is a constant between zero and one. The constant λ is chosen to properly set the mix between the LMS and ZF adaptations. In this manner, FIR filter module 104 will be adapted according to the following equation:

$$f_i(k+1)=f_i(k)+\mu e(k)r_{mix}(k-i), \quad (11)$$

If λ equals zero, the output 216 of averaging module 215 is equivalent to $r_k$ signal 103, which essentially equates to the LMS adaptation. If λ equals one, the output 216 of averaging module 215 is equal to the reconstructed ADC sample r'(k) signal 114 and the adaptation of filter module 104 receives as its input 116 the product of error signal 111 and r'(k) signal 114, which is essentially the ZF adaptation mode. If λ is any value between zero and one, output 216 of averaging module 215 comprises a combination of the r(k) signal 103 and r'(k) signal 114, thus providing a mix between the LMS and ZF adaptations to filter module 104.

Figure 5:
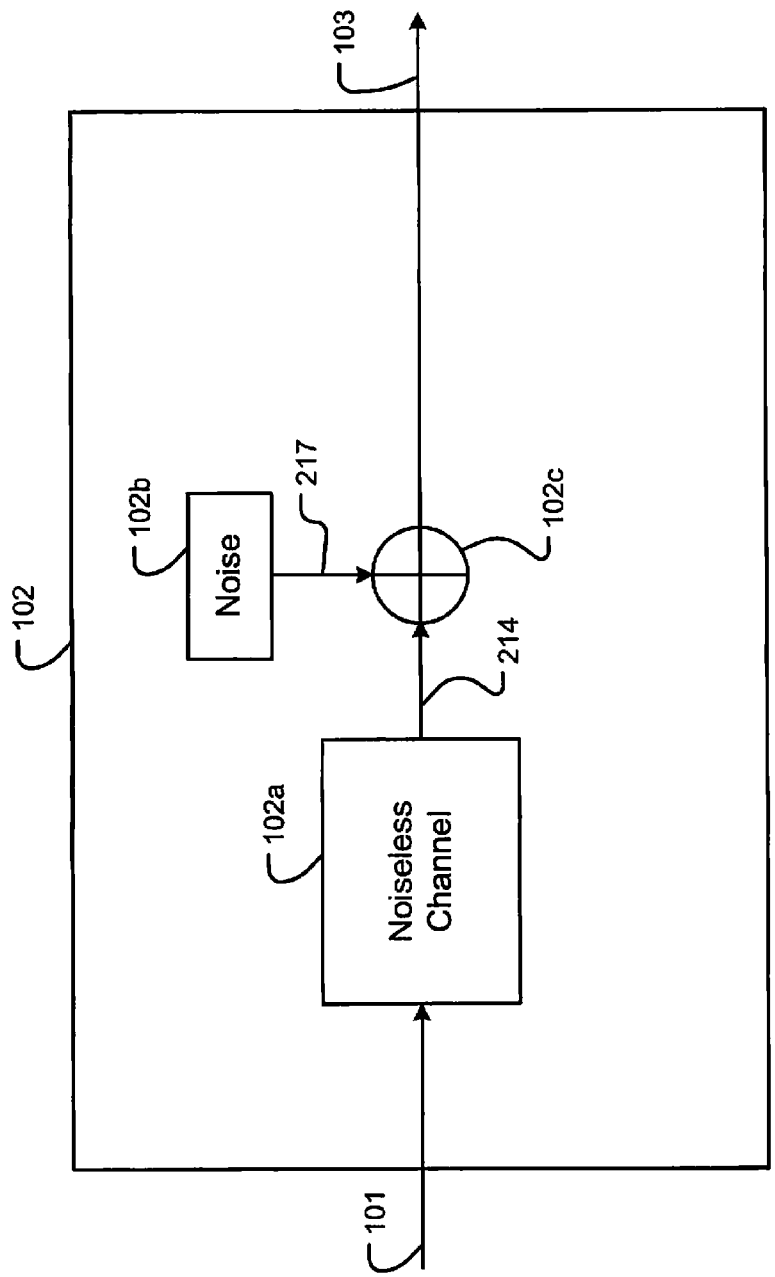
FIG. 5 is a functional block diagram of a channel module according to some embodiments of the present disclosure.

Referring now to FIG. 5, an illustrative representation of channel module 102 is shown. Channel module 102 comprises a noiseless channel module 102a and a noise module 102b, which may comprise, for example, inter-symbol interference. The output 214 of noiseless channel module 102a is summed with the noise 217 output by noise module 102b by addition module 102c. The binary input 101 to channel module 102 is received at noiseless channel module 102a. The output 214 of noiseless channel module 102a is referred to as the noiseless channel output. When the noiseless output signal 214 is mixed with the noise 217 from noise module 102b by module 102c, the output 103 is obtained. Practically speaking, of course, noiseless output signal 214 exists only in theory, as the noise component 217 of channel module 102 cannot be separated as illustrated in FIG. 5. Nonetheless, noiseless output 214 would be beneficial to use in the adaptation of filter module 104.

Figure 6:
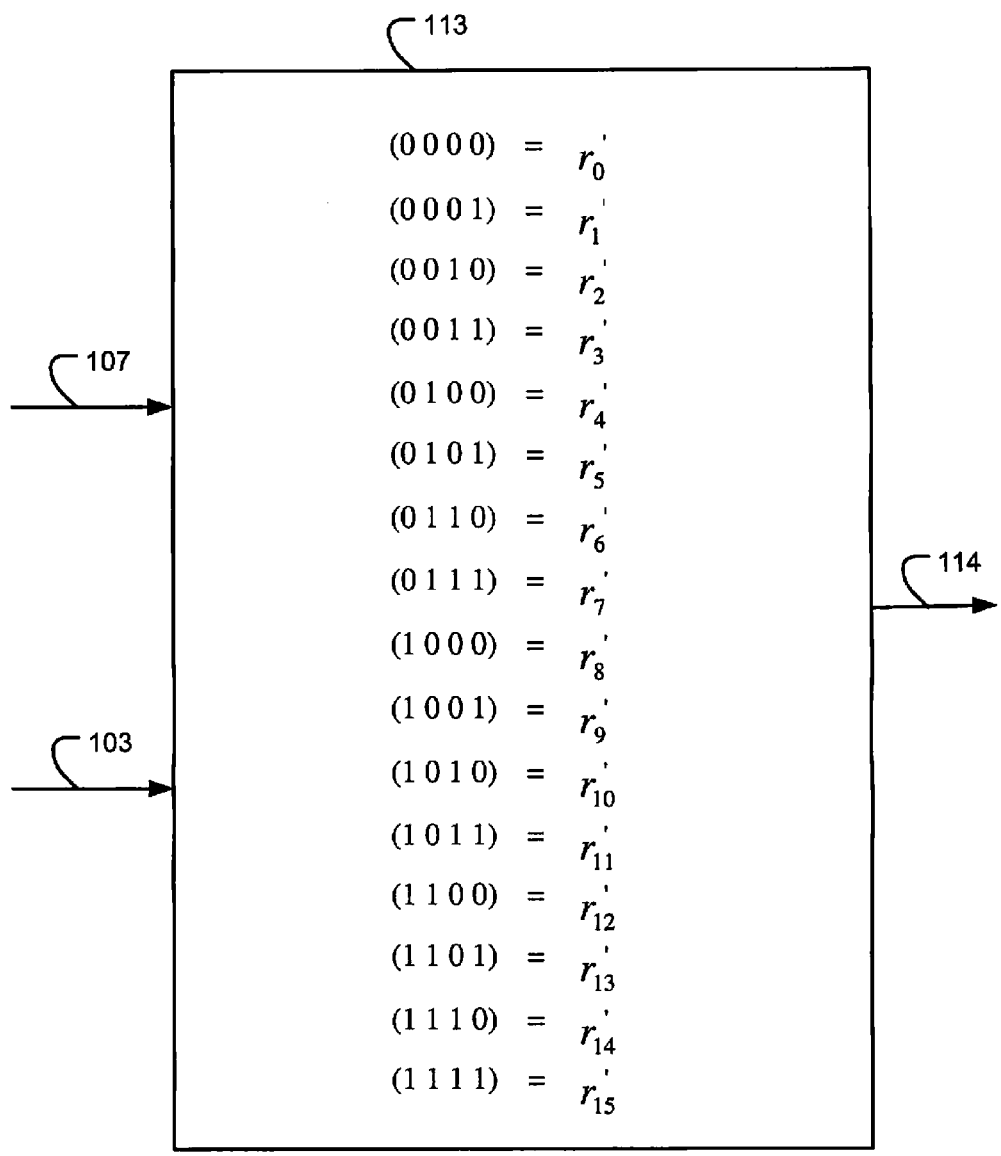
FIG. 6 is a functional block diagram of a channel response module according to some embodiments of the present disclosure.

Referring now to FIG. 6, the function of channel response module 113 is to reconstruct the noiseless output of noiseless channel module 102a, signal 214, as closely as possible. It has been shown that the noiseless signal 214 would be well suited for use in a ZF adaptation of filter module 104. Since the actual noiseless signal 214 exists only in theory, however, channel response module 113 attempts to determine the noiseless output 214 of noiseless channel module 102a based on available inputs.

To obtain a reconstructed version of noiseless signal 214, which will be referred to herein as ADC sample r'(k) 114, channel response module 113 may utilize the binary bit stream 107 output from the detector module 106 and the ADC sample r(k) 103 that is output from channel module 102. It can be assumed that the noiseless output 214 of noiseless channel module 102a is a function of the binary bit stream 101 input. Furthermore, the noiseless output 214 is predominantly impacted by a relatively small number of input bit values of signal 101 succeeding and preceding the moment of time of interest. Thus, output 214 can be governed by the equation:

$$r'_k=g(a_{k-n}\ldots a_{k+m}), \quad (12)$$

where $r'_k$ equals noiseless output 214 at time k, $a_{k-n}$ equals the binary input value 101 at time k−n, $a_{k+m}$ equals the binary input value 101 at time k+m, m and n are integers, and g(x) is an unknown function governing the response of noiseless channel module 102a based on input x. As stated above, in practice it is impossible to measure or obtain the noiseless output 214, attempts are made to reconstruct this approximation or reconstruction of the theoretical noiseless output 214, which is performed by channel response module 113 as follows.

It can be assumed that the noise 217 present in channel module 102 is random and has a zero mean, as would be the case in the event of perfectly random or white noise. Based on these assumptions, the average of output 103 of channel module 102 for a given input 101 would effectively approximate the noiseless output 214 of noiseless channel module 102a. That is, the output 103 of channel module 102, which can be measured directly, is governed by the following equation:

$$r_k=g(a_{k-n}\ldots a_{k+m})+(\text{noise}), \quad (13)$$

where $r_k$ equals output 103 of channel module 102, and the remaining variables are the same as above.

One can determine the noiseless output 214 by averaging the measured $r_k$ output 103 for binary input stream 101 over time. In practice, the number of binary input values on input 101 used to obtain the reconstructed ADC sample r'(k) 114 may be limited to four or five. That is, the output 103 of channel module 102 at a time k is predominantly impacted by the four or five values of input 101 surrounding and including time k. Thus, channel response module 113 may take the form of a look-up table that is updated based on its inputs of ADC sample r(k) 103 and the output 107 of the detector module 106.

For each input value of a set of values of binary input stream 101 there is a stored r'(k) value output 114 corresponding thereto. For example, in the case where it is assumed that the noiseless output 214 of noiseless channel module 102a depends primarily upon four most recent input values of binary bit stream 101, there are sixteen (or, $2^4$) stored r'(k) values. Specifically, these sixteen values correspond to the data sets where $(a_{k-n}\ldots a_{k+m})$=(0000), (0001), (0010) . . . (1111). Channel response module 113 utilizes the reconstructed binary bit stream output 107 of detector module 106 to perform this function. One equation that may be used to govern the output of channel response module 113 is as follows:

$$r'_{hd\ k}(a_{k-n}\ldots a_{k+m})=r'_{previous}(a_{k-n}\ldots a_{k+m})+\gamma(r_k-r'_{previous}(a_{k-n}\ldots a_{k+m})), \quad (14)$$

where $r'_k$ equals the updated r' output 114 corresponding to reconstructed bit stream data set $(a_{k-n}\ldots a_{k+m})$ input 107 at time k, $r'_{previous}(a_{k-n}\ldots a_{k+m})$ equals the previous value of stored r' output 114 corresponding to reconstructed bit stream value data set $(a_{k-n}\ldots a_{k+m})$, $r_k$ equals channel output 103 at time k, and γ is a constant that is chosen to control the updating step. Thus, channel response module 113 updates its output 114 for the data set of input values 107. In this manner, the output 114 of channel response module 113 will approximate the noiseless output 214 of noiseless channel module 102a.

Referring again to FIG. 6, an exemplary embodiment of channel response module 113 according to various embodiments of the present disclosure is illustrated. Channel response module 113 receives as its inputs both reconstructed binary bit stream 107 and ADC sample 103. The output 114 of channel response module 113 is determined by the following method. At a time k, channel response module 113 receives detector output 107, which can be referred to as $a_k$, and the output 103 of channel module 102, that may be referred to as $r_k$. Channel response module 113 stores a number of previous values of input 107. The number of stored samples is related to the memory of channel module 102, i.e., how much of an affect previous values of input 101 have on the output 103 of channel module 102. As stated above, it has been observed that four or five stored samples of input 107 may be sufficient to obtain adequate performance of channel response module 113.

FIG. 6 illustrates the example where four stored samples are used. The number of stored samples of input 107, which will be referred to as z, dictate the number of r' values that correspond to the input stream values 107. The number of the stored r' values is equal to p, where $p=2^z$. In FIG. 6, z=4 and, thus, p=16. For any moment in time, binary input 107 can comprise either a zero or one value. For each possible data set, a separate $r'_n$ is stored and updated, where n is one of the numbers between zero and p−1. Thus, a simple look-up table will be utilized by channel response module 113 that coordinates the data set with its corresponding $r'_n$ value, which is then output by channel response module 113.

As stated above, the r' values attempt to equate with the noiseless output 214 of noiseless channel module 102a, which exists only in theory, by averaging the actual output value 103 of channel module 102. For each data set, the r value received by channel response module 113 from input 103 is averaged with the previously received r value average that corresponds to that same data set. This averaging may utilize, for example, equation 14 above, although other averaging methods may be utilized.

Figure 7:
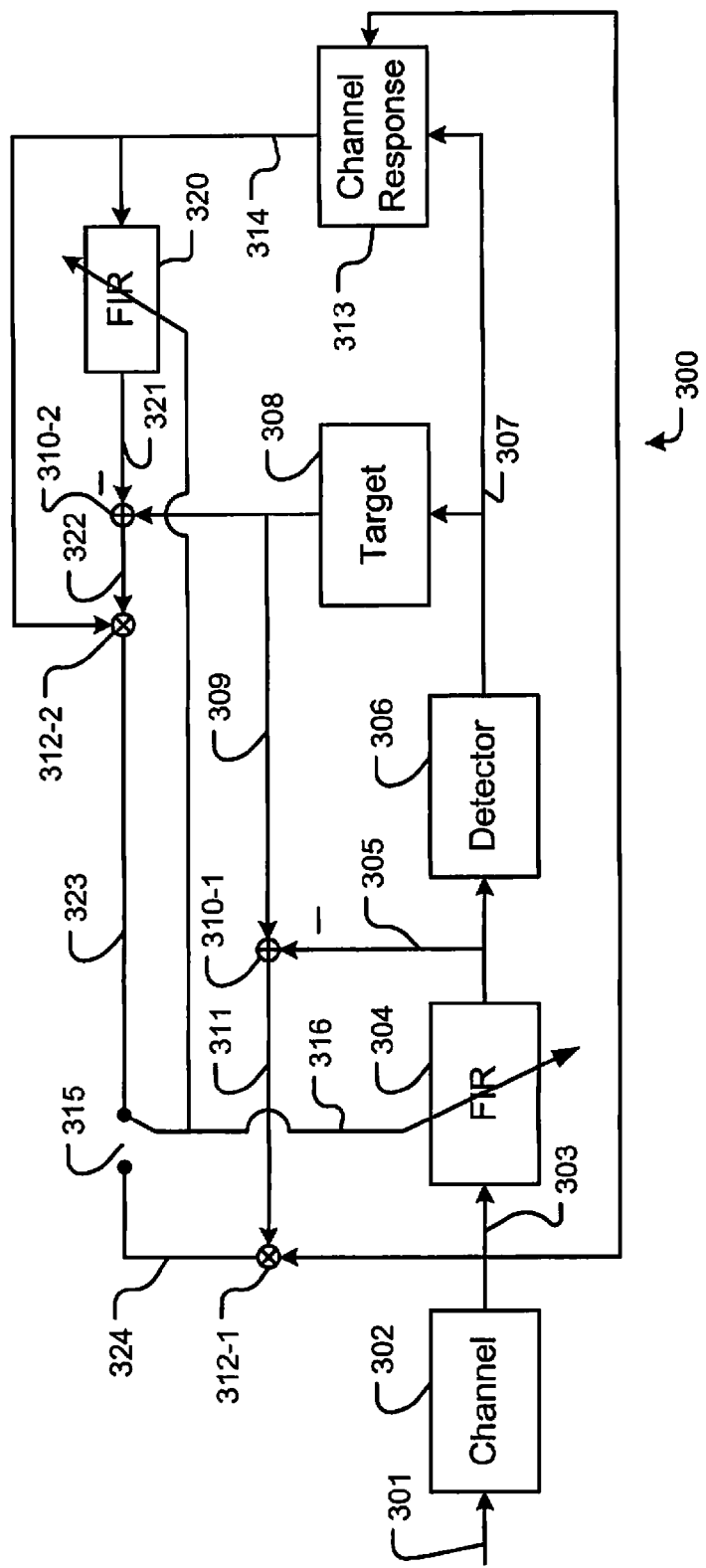
FIG. 7 is a functional block diagram of a FIR filter arrangement according to various embodiments of the present disclosure.

Referring now to FIG. 7, a FIR filter arrangement 300 is illustrated. A binary bit stream input 301 ($a_k$ or $a(k)$) is received by channel module 302, which outputs an analog-to-digital converter (ADC) sample 303 output ($r_k$ or $r(k)$). ADC sample 303 is input into FIR filter module 304, which outputs a FIR sample 305, which will be referred to as signal $Y_k$ or $Y(k)$. FIR sample 305 is received by detector module 306, which outputs a binary bit stream $a'_k$ or $a'(k)$ on line 307.

As is the case with the LMS adaptation discussed above in reference to FIG. 1, binary bit stream 307 is utilized by target response module 308 to form a reconstructed FIR sample 309, which will be referred to as $Y'_k$ or $Y'(k)$. Addition module 310-1 outputs error signal $e_k$ or $e(k)$ 311, which is equal to $Y'(k)-Y(k)$. Error signal 311 is utilized with multiplication module 312-1, as discussed more fully below.

In contrast to the prior art LMS adaptation discussed above, reconstructed binary bit stream 307 is further utilized by a channel response module 313. Channel response module 313 reconstructs the $r_k$ signal 303 to obtain value $r'_k$ or $r'(k)$ 314, as discussed above. This reconstructed ADC sample $r'_k$ will be used to further adapt FIR filter modules 304, 320. Second FIR filter module 320 may comprise a replica of FIR filter module 304, and is adapted with signal 316, similar to FIR filter module 304. Second FIR filter module 320 receives reconstructed ADC sample $r'_k$ 314 and outputs a second FIR sample 321, which will be referred to as signal $Y''_k$ or $Y''(k)$. Addition module 310-2 outputs second error signal $e''_k$ or $e''(k)$ 322, which is equal to $Y'(k)-Y''(k)$. Second error signal 322 is utilized with multiplication module 312-2 to output ZF adaptation signal 323, which may be utilized to adapt filter modules 304, 320 as discussed below.

In the exemplary embodiment of FIG. 7, switching module 315 controls the adaptation mode of FIR filter module 304. When set in the ZF mode, FIR filter module 304 receives as its input 316 ZF adaptation input 323, which comprises the product of error signal $e''(k)$ 322 and reconstructed ADC sample $r'_k$ 314. Thus, FIR filter modules 304, 320 will be adapted according to the following equation:

$$f_i(k+1)=f_i(k)+\mu e''(k)r'(k-i), \quad (15)$$

where μ is constant, r'(k−i) is the reconstructed ADC sample 314 at time (k−i) and all other variables are as described above. In MMSE mode, FIR filter modules 304, 320 receives as its input 316 the product 324 of $r_k$ signal 303 and error signal $e(k)$ 311. Thus, FIR filter modules 304, 320 are adapted according to the following equation:

$$f_i(k+1)=f_i(k)+\mu e(k)r'(k-i), \quad (16)$$

where r(k−i) equals the channel output r 103 at time (k−i) and all other variables are the same as above. The switching between the ZF and MMSE modes is accomplished by switching module 315. The switching module 315 may be set at the time of manufacture or, alternatively, may be adjustable by a user of the system in order to tune performance of filter arrangement 300.

Figure 8:
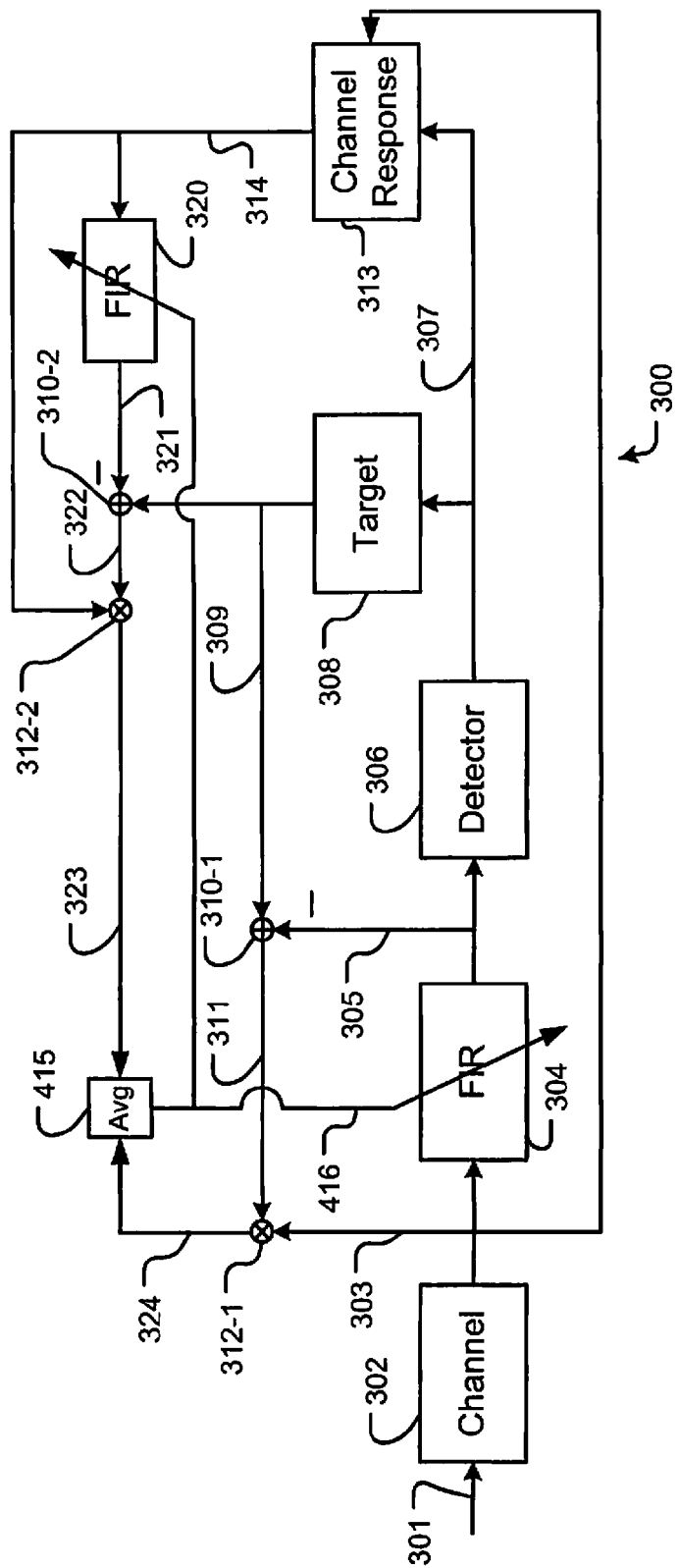
FIG. 8 is a functional block diagram of a FIR filter arrangement according to various embodiments of the present disclosure.

Referring now to FIG. 8, FIR filter arrangement 400 according to various embodiments of the present disclosure is illustrated. FIR filter arrangement 400 is similar to FIR filter arrangement 300 illustrated in FIG. 7, and the same reference numerals are used to reference common elements present in both arrangements 300, 400. One difference between FIR filter arrangement 300 and FIR filter arrangement 400 is that the switching module 315 of arrangement 300 has been replaced with an averaging module 415 in arrangement 400. Averaging module 415 is configured to provide a mixed adaptation to FIR filter module 304. FIR filter module 304 will receive as its input the output 416 of averaging module 415.

The output of averaging module 415 may be governed by the following equation:

$$A_{mix}(k)=\lambda A'(k)+(1-\lambda)A(k), \quad (17)$$

where $A_{mix}(k)$ is the adaptation signal 416 at time k, A(k) equals output 323 of multiplication module 312-2 at time k, A'(k) equals the output 324 of multiplication module 312-1 at time k, and λ is a constant between zero and one. The constant λ is chosen to properly set the mix between the MMSE and ZF adaptations. In this manner, FIR filter modules 304, 320 will be adapted according to the following equation:

$$f_i(k+1)=f_i(k)+\lambda\mu e''(k)r'(k-i)+(1-\lambda)\mu e(k)r(k-i), \quad (18)$$

where all variables are as described above. If λ equals zero, the output 416 of averaging module 415 is equivalent to $A_k$ signal 323, which essentially equates to the ZF adaptation. If λ equals one, the output 416 of averaging module 415 is equal to the A'(k) signal 324 and the adaptation of filter modules 304, 320 receives as its input 416 the A'(k) signal 324, which is essentially the MMSE adaptation mode. If λ is any value between zero and one, output 416 of averaging module 415 comprises a combination of the A(k) signal 323 and A'(k) signal 324, thus providing a mix between the MMSE and ZF adaptations to filter modules 304, 320.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A system for adapting an equalizer, the system comprising:
   a channel module that receives input data and outputs a channel output comprising a noiseless component and a noise component;
   a filter module that filters the channel output to obtain a filter sample;
   a detector module that processes the filter sample to estimate the input data;
   a target response module that processes the estimated input data to obtain a target response output, wherein the target response output comprises a desired response of the filter module; and
   a channel response module that processes the estimated input data to obtain a noiseless channel output, wherein the noiseless channel output comprises an approximation of the noiseless component of the channel output,
   wherein the filter module is adapted based on the channel output, the filter sample, the target response output, and the noiseless channel output,
   wherein the filter module is adapted based on an error signal comprising a difference between the filter sample and the target response output, and
   wherein the filter module is adapted based on a product of i) the error signal and ii) a combination of the channel output and the noiseless channel output.

2. The system of claim 1, wherein the filter module is adapted based on a product of the error signal and the noiseless channel output.

3. The system of claim 1, wherein the filter module is adapted based on a product of the error signal and the channel output.

4. The system of claim 3, wherein the filter module is adapted based on a product of the error signal and the noiseless channel output.

5. The system of claim 1, wherein the combination comprises an average of the channel output and the noiseless channel output.

6. The system of claim 5, wherein the average is determined by the equation:

$$r_{mix}(k)=\lambda r'(k)+(1-\lambda)r(k),$$

where $r_{mix}(k)$ comprises the average of the channel output and noiseless channel output at time k, $r'(k)$ comprises the noiseless channel output at time k, $r(k)$ comprises the channel output at time k, and $\lambda$ comprises a constant having a value between 0 and 1, inclusive.

7. The system of claim 1, wherein the filter module is adapted such that the error signal is minimized.

8. The system of claim 1, wherein the filter module is adapted based on the equation:

$$f_i(k+1)=f_i(k)+\mu e(k)r_{mix}(k-i),$$

where i comprises an integer, $f_i(k)$ comprises an $i^{th}$ coefficient of the filter module at time k, $e(k)$ comprises the error signal at time k, $\mu$ comprises a constant and $r_{mix}(k-i)$ comprises an average of the channel output and the noiseless channel output at time k−i.

9. A system for adapting an equalizer, the system comprising:
   a channel module that receives input data, and outputs a channel output comprising a noiseless component and a noise component;
   a filter module that filters the channel output to obtain a filter sample;
   a detector module that processes the filter sample to estimate the input data;
   a target response module that processes the estimated input data to obtain a target response output, wherein the target response output comprises a desired response of the filter module; and
   a channel response module that processes the estimated input data to obtain a noiseless channel output, wherein the noiseless channel output comprises an approximation of the noiseless component of the channel output,
   wherein the filter module is adapted based on the channel output, the filter sample, the target response output, and the noiseless channel output, and
   wherein the noiseless channel output is based on the equation:

$$r'_k(a_{k-n}\ldots a_{k+m})=r'_{previous}(a_{k-n}\ldots a_{k+m})+\gamma(r_k-r'_{previous}(a_{k-n}\ldots a_{k+m})),$$

where $(a_{k-n}\ldots a_{k+m})$ comprises a data set comprised of the estimated input data at times k−n through k+m, $r'_k(a_{k-n}\ldots a_{k+m})$ comprises the noiseless channel output corresponding to $(a_{k-n}\ldots a_{k+m})$ at time k, $r'_{previous}(a_{k-n}\ldots a_{k+m})$ comprises the noiseless channel output corresponding to $(a_{k-n}\ldots a_{k+m})$ immediately preceding time k, $r_k$ comprises the channel output at time k and $\gamma$ comprises a constant.

10. The system of claim 9, wherein the filter module is adapted based on an error signal comprising a difference between the filter sample and the target response output.

11. The system of claim 10, wherein the filter module is adapted based on a product of the error signal and the noiseless channel output.

12. The system of claim 10, wherein the filter module is adapted based on a product of the error signal and the channel output.

13. The system of claim 12, wherein the filter module is adapted based on a product of the error signal and the noiseless channel output.

14. The system of claim 10, wherein the filter module is adapted based on a product of error signal and a combination of the channel output and the noiseless channel output.

15. The system of claim 14, wherein the combination comprises an average of the channel output and the noiseless channel output.

16. The system of claim 15, wherein the average is determined by the equation:

$$r_{mix}(k)=\lambda r'(k)+(1-\lambda)r(k),$$

where $r_{mix}(k)$ comprises the average of the channel output noiseless channel output at time k, $r'(k)$ comprises the noiseless channel output at time k, $r(k)$ comprises the channel output at time k, and $\lambda$ comprises a constant having a value between 0 and 1, inclusive.

17. The system of claim 10, wherein the filter module is adapted such that the error signal is minimized.

18. The system of claim 10, wherein the filter module is adapted based on the equation:

$$f_i(k+1)=f_i(k)+\mu e(k)r_{mix}(k-i),$$

where i comprises an integer, $f_i(k)$ comprises an $i^{th}$ coefficient of the filter module at time k, $e(k)$ comprises the error signal at time k, $\mu$ comprises a constant and $r_{mix}(k-i)$ comprises an average of the channel output and the noiseless channel output at time k−i.

19. A method for adapting an equalizer, the method comprising:
   processing input data to obtain a channel output comprising a noiseless component and a noise component;

filtering the channel output with a filter module to obtain a filter sample;
processing the filter sample to estimate the input data;
processing the estimated input data to obtain a target response output that comprises a desired response of the filter module;
processing the estimated input data to obtain a noiseless channel output that comprises an approximation of the noiseless component of the channel output; and
adapting the filter module based on the channel output, the filter sample, the target response output, and the noiseless channel output,
wherein the filter module is adapted based on an error signal comprising a difference between the filter sample and the target response output, and
wherein the filter module is adapted based on a product of i) the error signal and ii) a combination of the channel output and the noiseless channel output.

20. The method of claim 19, wherein the filter module is adapted based on a product of the error signal and the noiseless channel output.

21. The method of claim 19, wherein the filter module is adapted based on a product of the error signal and the channel output.

22. The method of claim 21, wherein the filter module is adapted based on a product of the error signal and the noiseless channel output.

23. The method of claim 19, wherein the combination comprises an average of the channel output and the noiseless channel output.

24. The method of claim 23, wherein the average is determined by the equation:

$$r_{mix}(k) = \lambda r'(k) + (1-\lambda) r(k),$$

where $r_{mix}(k)$ comprises the average of the channel output and noiseless channel output at time k, $r'(k)$ comprises the noiseless channel output at time k, $r(k)$ comprises the channel output at time k, and $\lambda$ comprises a constant having a value between 0 and 1, inclusive.

25. The method of claim 19, wherein the filter module is adapted such that the error signal is minimized.

26. The method of claim 19, wherein the filter module is adapted based on the equation:

$$f_i(k+1) = f_i(k) + \mu e(k) r_{mix}(k-i),$$

where i comprises an integer, $f_i(k)$ comprises an $i^{th}$ coefficient of the filter module at time k, $e(k)$ comprises the error signal at time k, $\mu$ comprises a constant and $r_{mix}(k-i)$ comprises an average of the channel output and the noiseless channel output at time k−i.

27. A method for adapting an equalizer, the method comprising:
processing input data to obtain a channel output comprising a noiseless component and a noise component;
filtering the channel output with a filter module to obtain a filter sample;
processing the filter sample to estimate the input data;
processing the estimated input data to obtain a target response output that comprises a desired response of the filter module;
processing the estimated input data to obtain a noiseless channel output that comprises an approximation of the noiseless component of the channel output; and
adapting the filter module based on the channel output, the filter sample, the target response output, and the noiseless channel output,
wherein the noiseless channel output is based on the equation:

$$r'_k(a_{k-n} \ldots a_{k+m}) = r'_{previous}(a_{k-n} \ldots a_{k+m}) + \gamma(r_k - r'_{previous}(a_{k-n} \ldots a_{k+m})),$$

where $(a_{k-n} \ldots a_{k+m})$ comprises a data set comprised of the estimated input data at times k−n through k+m, $r'_k(a_{k-n} \ldots a_{k+m})$ comprises the noiseless channel output corresponding to $(a_{k-n} \ldots a_{k+m})$ at time k, $r'_{previous}(a_{k-n} \ldots a_{k+m})$ comprises the noiseless channel output corresponding to $(a_{k-n} \ldots a_{k+m})$ immediately preceding time k, $r_k$ comprises the channel output at time k and $\gamma$ comprises a constant.

28. The method of claim 27, wherein the filter module is adapted based on an error signal comprising a difference between the filter sample and the target response output.

29. The method of claim 28, wherein the filter module is adapted based on a product of the error signal and the noiseless channel output.

30. The method of claim 28, wherein the filter module is adapted is based on a product of the error signal and the channel output.

31. The method of claim 30, wherein the filter module is adapted based on a product of the error signal and the noiseless channel output.

32. The method of claim 28, wherein the filter module is adapted based on a product of error signal and a combination of the channel output and the noiseless channel output.

33. The method of claim 32, wherein the combination comprises an average of the channel output and the noiseless channel output.

34. The method of claim 33, wherein the average is determined by the equation:

$$r_{mix}(k) = \lambda r'(k) + (1-\lambda) r(k),$$

where $r_{mix}(k)$ comprises the average of the channel output noiseless channel output at time k, $r'(k)$ comprises the noiseless channel output at time k, $r(k)$ comprises the channel output at time k, and $\lambda$ comprises a constant having a value between 0 and 1, inclusive.

35. The method of claim 28, wherein the filter module is adapted such that the error signal is minimized.

36. The method of claim 28, wherein the filter module is adapted based on the equation:

$$f_i(k+1) = f_i(k) + \mu e(k) r_{mix}(k-i),$$

where i comprises an integer, $f_i(k)$ comprises an $i^{th}$ coefficient of the filter module at time k, $e(k)$ comprises the error signal at time k, $\mu$ comprises a constant and $r_{mix}(k-i)$ comprises an average of the channel output and the noiseless channel output at time k−i.

* * * * *